United States Patent Office 2,807,047
Patented Sept. 24, 1957

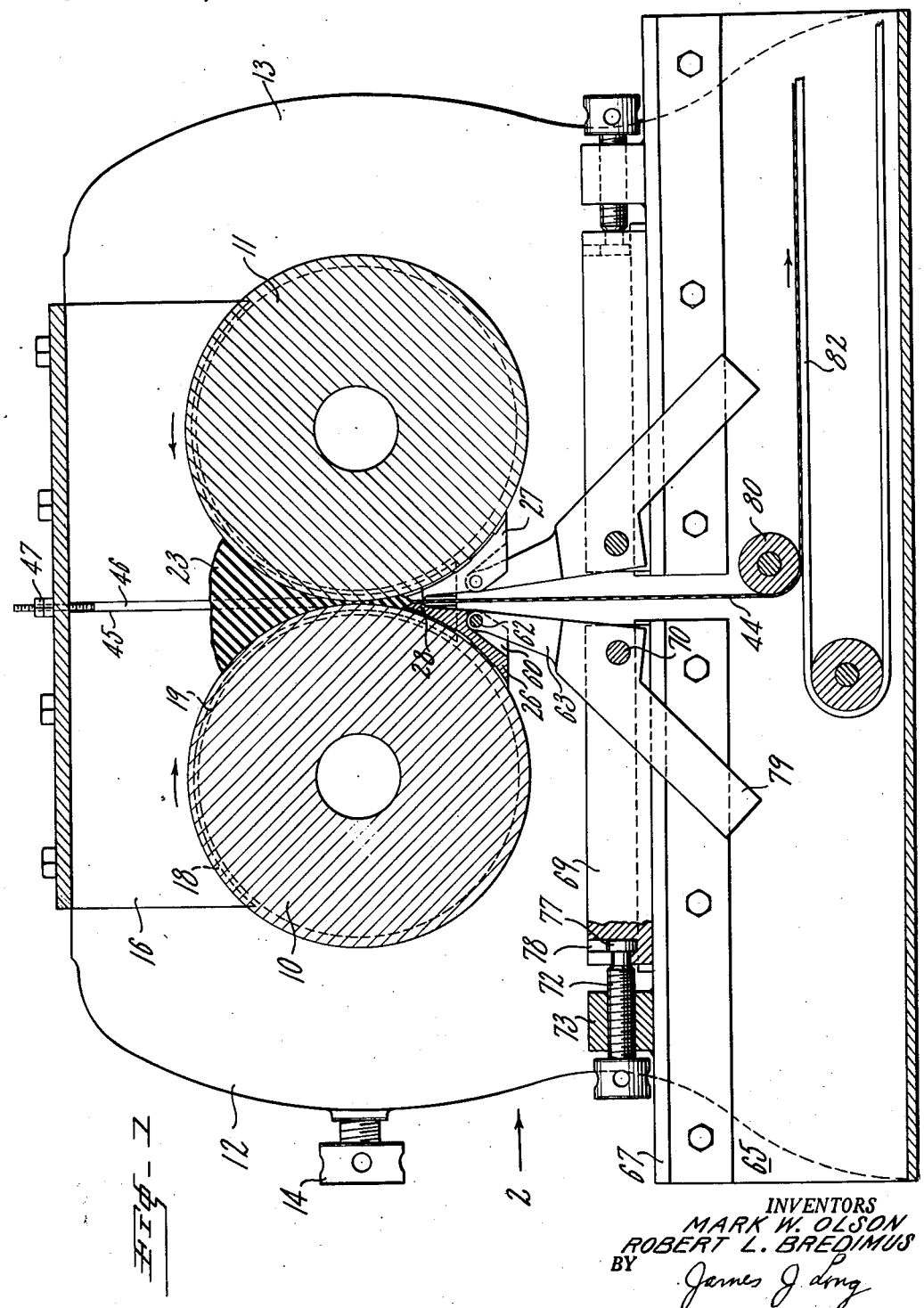

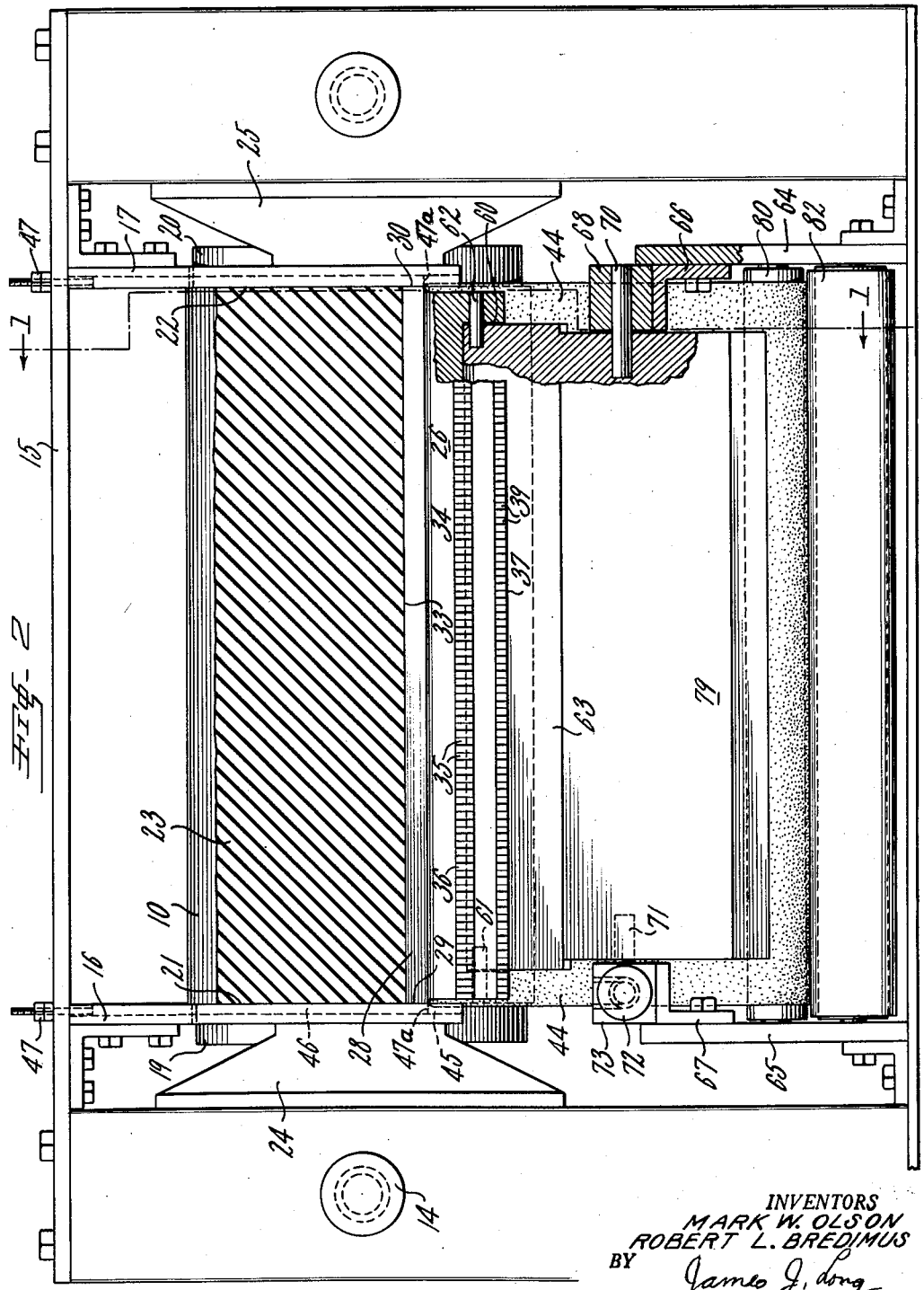

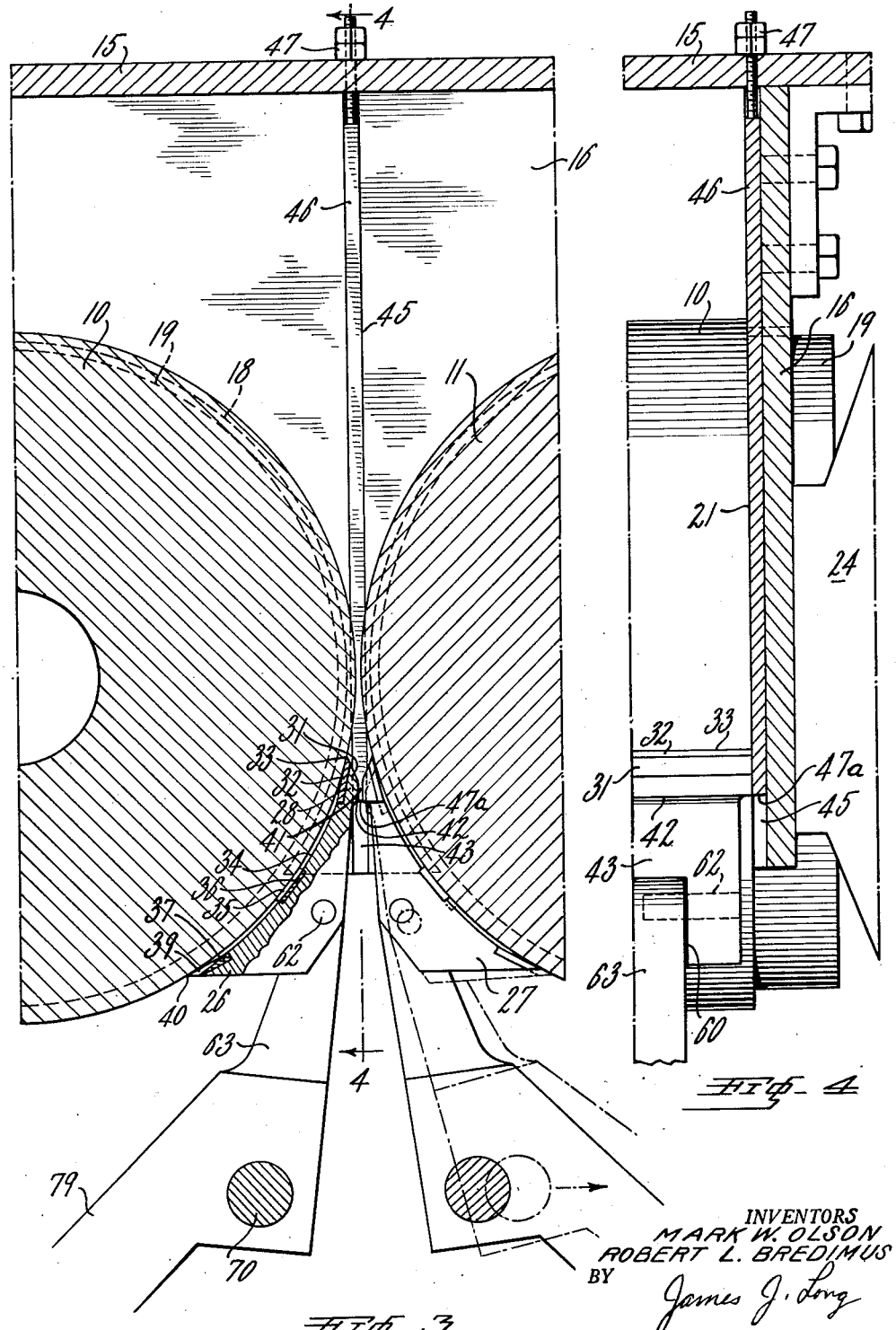

2,807,047

PLASTIC SHAPING APPARATUS

Mark W. Olson, Allendale, and Robert L. Bredimus, Oakland, N. J., assignors to United States Rubber Company, New York, N. Y., a corporation of New Jersey Application December 3, 1954, Serial No. 472,866

4 Claims. (Cl. 18—2)

This invention relates to an apparatus for shaping plastic materials, and more particularly it relates to an apparatus for shaping raw rubber stocks and the like generally continuously in the form of a running sheet or band.

One object of the invention is to provide an apparatus capable of making sheets or bands of plastic stock of greater width than can be produced conveniently by the usual extrusion machines.

Another object is the provision of a plastic shaping apparatus capable of producing rubber sheets and the like of greater variety of thicknesses and/or of more accurately controlled thickness than can generally be achieved with the usual rubber mill.

Still another object is to provide a plastic processing machine that makes it possible to simplify factory operations by reducing the amount of handling of the plastic stock, in comparison to the amount of handling necessary when the stock is milled and shaped on separate machines.

It is still a further object of the invention to provide a combined plastic milling and shaping apparatus embodying means for convenient and efficient adjustment or compensation for wear as well as for effecting desired variations in the thickness of the shaped plastic.

The foregoing and additional objects and advantages of the invention will be made manifest in the following detailed description, which is intended to be read with reference to the accompanying drawings, wherein:

Fig. 1 is a side or end elevational view of a combined roll mill and extrusion device of the invention, with parts broken away and parts in section;

Fig. 2 is a front elevational view of the machine, with parts shown in section and parts broken away, taken in the direction of the arrow 2 in Fig. 1;

Fig. 3 is a fragmentary view similar to Fig. 1 on a larger scale, with an adjusted position of one die member indicated in outline; and, Fig. 4 is a view taken along the line 4—4 of Fig. 3.

The invention contemplates the utilization of an arrangement of cooperating calender or mill rolls which force the plastic being processed into and through a nip defined between such rolls, and thence into and through a cooperating arrangement of die members disposed in contact with the surface of the rolls in proximity to the said nip. The die members define an extrusion passageway or throat, through which the plastic is urged positively under great pressure by the action of the mill rolls, and from which the plastic emerges in a desired shape corresponding to the shape of the die orifice. The pressure exerted on the die members by the rubber stock passing therethrough forces bearing surfaces provided on such members into close conformity with the mill rolls. Each die member is pivotally mounted on an arm that is in turn pivotally mounted on a member adjustable transversely on the mill roll nip and die passage, the arrangement being such that each die member can thereby be positioned precisely, by a simple rectilinear movement, at the exact position necessary to receive the stock from the mill roll nip and form it into a sheet of the desired thickness.

Referring to the drawings, the embodiment of the invention shown therein includes two mill rolls 10, 11 rotatably supported at each end in suitable bearings (not shown) contained within end supporting members 12, 13. It will be understood that the mill rolls are adapted to be rotated toward each other by the usual driving means (not shown), and the spacing between the mill rolls may be adjusted as desired with the aid of the usual screws 14 extending into the end supports into engagement with the bearing assemblies.

An overhead supporting plate 15 extends longitudinally of the mill rolls from one end support to the other; and serves as an attachment for downwardly extending end plates 16, 17, the lower surfaces of which are cut out along a curved line 18 to fit into proximity with end portions 19, 20 of reduced diameter at each end of each mill roll. Such end plates fit snugly against radial surfaces 21, 22 of the mill rolls formed at such reduced portions, and the end plates thereby serve as a barrier to contain a bank 23 of rubber or plastic stock on the mill rolls. Vertical supporting plates 24, 25 extending from the outer surfaces of the end plates to the main end supports serve to maintain the end plates securely in contact with the radial surfaces of the mill rolls against the outward pressure exerted by the bank of rubber or other plastic stock as it is worked by the mill rolls.

The die assembly itself is disposed between the lower inner surfaces of the mill rolls, and comprises two die members or shoes 26, 27 extending longitudinally of the rolls and parallel to the axes thereof. Each such shoe is similarly constructed and mounted, and therefore the description of one such member will suffice for both. At its upper end 28, that is, the portion closest to the nip of the mill rolls, the shoe corresponds in length to the length of the principal face of the mill rolls, that is, the terminal ends 29, 30 of such shoe abut against the inner faces of the end plates 16, 17 in sliding engagement therewith toward their lower extremities. The upper surface 31 of the shoe is slanted downwardly and inwardly toward a center line extending vertically through the neck of the rolls. An insert 32 of bearing material on the upper end surface of the shoe in contact with the surface of the mill roll provides a comparatively sharp or distinct bearing edge or scraping edge 33 that serves to direct the rubber, being forced downwardly by the action of the rolls, away from the surface of the rolls and toward the center line of the die arrangement.

A surface 34 of the shoe facing the surface of the mill roll is curved in accordance with the curvature of the mill roll and is slightly spaced from the surface of the mill roll, so as to provide on such portion of the shoe a surface that is parallel to the mill roll surface. The upper bearing insert 32 is inclined toward the surface of the mill roll into contact therewith to furnish at the upper edge 33 the scraping engagement or contact referred to previously. A central portion of the curved surface 34 of the shoe is provided with an additional bearing insert 35 spaced from the first mentioned insert and providing a bearing surface conforming to the mill roll surface in contact therewith, by reason of being similarly curved and by reason of being offset radially toward the center of the mill roll from the surface 34 of the shoe. Such bearing insert is provided with a series of milled slots 36 along its entire length that constitute a series of relief passageways extending circumferentially of the mill roll, for the purpose of preventing any accumulation of plastic stock at the leading edge of such bearing, between the shoe and the mill roll surface, since there would be a tendency for any such accumulated stock to force the shoe away from the mill roll surface, to the detriment of the desired scraping action.

At the lower end of the curved surface 34 of the shoe an additional bearing insert 37 is provided, and this insert is similarly provided with a series of slots 39 which constitute relief passageways for plastic stock adhering to the surface of the mill roll. The lower or trailing edge 40 of this insert is inclined radially toward the mill roll surface so that such trailing edge contacts the mill roll surface slidably.

The upper downwardly slanting surface 31 of the shoe terminates in a generally vertically downwardly extending straight portion 41, which, in cooperation with the similarly formed oppositely disposed surfaces of the other shoe, serves to define an extrusion passageway or throat in which the desired shape is imparted to the plastic stock. At the terminal or trailing edge 42 of such vertical surface 41, that is, at the exit orifice of the die passageway, the shoe is recessed outwardly away from the vertical center line of the die passage, to provide an enlarged space 43 through which the extruded plastic, which now has the form of a sheet 44, can pass freely, without undesirable contact with the die members, thereby avoiding disruption or wrinkling of the sheet or sticking to the die parts. Such enlarged space 43 allows the plastic to expand freely upon emerging from the die passageway, it being understood that raw rubber stocks and similar plastics having elastic memory normally tend to swell transversely upon issuing from a die orifice. To provide at the lateral edges of the sheet for such swelling or enlargement widthwise of the sheet, a slot 45 is milled in each of the end plates 16, 17 along the vertical center line of the mill roll nip and die passageway. For the purpose of making the required closure at the end surfaces of the mill roll nip area and the end of the die passageway, a vertically slidable filler piece 46 is fitted snugly into the slot. By means of a nut and screw arrangement 47 extending through the top supporting plate 15, the filler strip 46 may be raised or lowered as desired in order that the lower end 47a thereof may be positioned precisely at the exit edge of the die passageway. It will be understood that this arrangement is duplicated at each end of the assembly, as will be most apparent from inspection of Fig. 2. Such adjustment is made in conjunction with adjustment of supporting mechanism of the die shoes that will now be described.

A lower central portion 60 of the die shoe is recessed away from the vertical center line of the die assembly, and in this recess there is attached, by means of horizontal pins 61, 62 extending through the ends of the die shoe, a beam or thrust bar 63 which thereby serves as a pivotal support for the shoe. For the purpose of supporting the beam 63, vertical end supporting plates 64, 65 extend upwardly from each side of the lower portion of the framework of the machine. These vertical supports carry toward their upper ends angle members 66, 67, on the upper horizontal surface of which there rest sliding support blocks 68, 69 through which pins 70, 71 pass, thereby pivotally suspending the supporting arm or beam 63. To provide for horizontal adjusting movement of the supporting blocks, an adjusting screw 72 is threaded through a fixed block 73 attached to the upper surface of each supporting angle, such screw being provided with an enlarged head 77 that rotates within a cooperating slot 78 provided in each of the supporting blocks. The arrangement is such that rotation of the adjusting screw 72 causes such screw to move horizontally in the appropriate direction with respect to the fixed block 76, thereby advancing or withdrawing the adjusting block horizontally. It will be understood that this arrangement is duplicated at each side of the machine, in such manner that each die member or shoe and associated parts is thus rendered adjustable toward each other.

Each supporting beam 63 has a downwardly extending portion 79 disposed on the opposite side of the supporting pins 70, 71 from the portion of such arm on which the die shoe is mounted. This oppositely extending portion of the supporting arm is sufficiently massive to counterbalance the weight of the die shoe, as an aid in initially properly positioning the die shoe against the mill roll, and this arrangement is also of assistance in assembling or disassembling the machine.

A rotatably supported guide roller 80 positioned below the die assembly serves to change the direction of travel of the extruded rubber or plastic sheet 44 passing vertically downwardly from the die orifice, in such manner that the plastic sheet is deposited on the upper surface of a conveyor belt 82 which is driven by suitable means (not shown) for the purpose of carrying the extruded sheet away from the machine for further processing.

In operation, the die shoes are initially positioned symmetrically in essentially the desired location below the nip of the mill rolls, and the roll driving means is actuated to rotate the rolls. A charge of the plastic material which has previously been mixed with any desired compounding ingredients such as fillers, vulcanizing agents, etc., is placed on the upper portion of the mill rolls. Rotation of the rolls forces the plastic stock through the gap therebetween, such gap being adjusted to an appropriate value by manipulation of the mill roll adjusting screws. The plastic stock after passing through the nip of the mill rolls is directed or scraped away from the surface of the rolls by the sharp upper edges and slanting faces of the die shoes, in such manner that the stock is directed into the extrusion orifice. The stock is forced downwardly into the converging passageway defined by the upper slanting faces of the die shoes under great pressure, and there is a substantial component of such pressure exerted against the upper surfaces of the die members in a direction toward the mill rolls, with the result that the shoes tend to rotate around their pivotal connections to the supporting arms in such manner that the shoes bear against the mill rolls with great force, thereby preventing any substantial quantity of the plastic stock from working its way between the die shoes and the mill rolls. However, there is a very small amount of plastic stock that does find its way between the shoe and the mill roll surfaces, but the amount of such plastic is only very small, and constitutes only a thin film that remains on the surface of the mill rolls as they revolve, and thus returns eventually to the main bank of stock in the upper portion of the mill. This thin film of plastic stock is prevented from accumulating between the shoe and the roll by the provision of the milled slots in the remaining bearing surfaces of the shoes.

To produce a sheet of desired thickness, it is necessary only to manipulate the adjusting screws that vary in a horizontal position of the pivotal support for the die shoe supporting beams. The result of such adjusting movement is indicated most clearly in Fig. 3. Similarly, as wear of the shoe bearing surfaces takes place, an appropriate correcting adjustment may be made in the same manner to bring the die shoes back into the desired relative position necessary to produce the plastic sheet of the required thickness. It is important to note that because of the manner in which the shoes are pivotally mounted on their supporting beams, the desired adjusting movement can be effected throughout as wide a range as necessary while still maintaining the upper or scraping edge of the shoe in the desired tangential operative engagement with the mill roll surface. Because the bearing surfaces provided at spaced intervals on the shoe members are arranged along a line of curvature essentially corresponding to the curvature of the mill rolls, exceptional precision and steadiness in the positioning of the shoes is achieved and maintained at all times in spite of normal wear on the bearing surfaces, and especially on the leading or scraping edges of the shoes.

The initial point of engagement of the plastic with the die members after passing through the mill roll nip is the uppermost edge of each die member, and such edge bears firmly against the respective mill roll surface at all times during operation of the machine, regardless of any wear on such edge. Such edge also represents the commencement of a slanting surface defining, in co-operation with a corresponding surface of the opposite die member, the converging portion of the die passageway, so that the plastic stock is always directed away from the roll into the die passage.

Having thus described our invention, what we claim and desire to protect by Letters Patent is:

1. An apparatus for shaping plastic material comprising in combination a roll mill having a nip through which the plastic is forced under pressure, a pair of cooperating die members fitting into said mill for receiving the plastic forced through the nip, said die members defining an extrusion passage corresponding to a shape that it is desired to impart to the plastic, a mounting beam for each die member, a pivotal connection between each die member and its respective mounting beam, each said mounting beam being an adjustable supporting means for each mounting beam, in turn pivotally attached to further adjustable supporting means for positioning the die members in operative engagement with the mill.

2. An apparatus for shaping plastic material comprising in combination a pair of cooperating rolls defining between them a gap through which the plastic is forced under pressure when the rolls are rotated toward each other, retaining plates positioned at the ends of said rolls for confining a bank of plastic material on the rolls and in said gap, a pair of die members disposed longitudinally in contact with said rolls and defining a die passageway for receiving the plastic after passing through said gap, said retaining plates also being positioned at the ends of said die members to define end walls of said die passageway, said die passageway having a definitely located exit orifice from which the plastic emerges freely, adjusting means for said die members for varying the position of said die members and the thickness of said orifice, each of the said side retaining plates having a slot in its surface at an area of contact with the said ends of the said die passageway, and a sliding filler piece disposed in said slot in engagement with the ends of said die members, said sliding filler piece terminating at a point corresponding to the said exit of the die, and means for adjusting the position of said filler piece in accordance with adjustments in the position of the die members.

3. An apparatus for shaping plastic material comprising in combination a roll mill having a nip through which the plastic is forced under pressure, a pair of cooperating adjustable die members fitted into said mill and defining an extrusion passage for receiving the plastic from the nip, each of said die members having a first bearing surface near said nip bearing against a mill roll and serving to scrape plastic therefrom and direct it into the extrusion passage, each die member having an additional bearing surface spaced from said first bearing surface in the direction of rotation of the mill roll, said additional bearing surface being provided with surface slots extending circumferentially of the mill roll serving as passageways for any plastic remaining on the surface of the roll.

4. An apparatus for shaping plastic material comprising in combination a roll mill having a nip through which the plastic is forced under pressure, a pair of cooperating die members fitting into said mill for receiving the plastic forced through the nip, said die members defining an extrusion passage corresponding to a shape that it is desired to impart to the plastic, a mounting beam for each die member, a pivotal connection between each said die member and its respective mounting beam, each said mounting beam being an adjustable supporting means for each mounting beam, in turn pivotally attached to further adjustable supporting means for positioning the die members in operative engagement with the mill, retaining plates positioned at the ends of rolls of said mill for confining a bank of plastic material on said rolls and in said nip, said retaining plates also being positioned at the ends of said die members to define end walls of said extrusion passage, said extrusion passage having a definitely located exit orifice from which the plastic emerges freely, each of the said side retaining plates having a slot in its surface at an area of contact with the said ends of the said extrusion passage, a sliding filler piece disposed in said slot in engagement with the ends of said die members, said sliding filler piece terminating at a point corresponding to the said exit of the extrusion passage, means for adjusting the position of said filler piece in accordance with adjustments in the position of the die members, each of the said die members having a first bearing surface near said nip bearing against one of said mill rolls, each die member having an additional bearing surface spaced from said first bearing surface in the direction of rotation of the mill roll, said bearing surfaces being located in a curved plane corresponding to the curvature of the mill roll, and said additional bearing surface being provided with surface slots extending circumferentially of the mill roll serving as passageways for any plastic remaining on the surface of the roll.

References Cited in the file of this patent

FOREIGN PATENTS

| | | |
|---|---|---|
| 1,058,636 | France | Nov. 4, 1953 |
| 339,890 | Italy | Apr. 29, 1936 |